(12) United States Patent
Wanat et al.

(10) Patent No.: US 8,272,589 B2
(45) Date of Patent: Sep. 25, 2012

(54) BLADE ASSEMBLY FOR FOOD PROCESSOR

(75) Inventors: David J Wanat, Meridan, CT (US); Charles Z. Krasznai, Bridgeport, CT (US); Chi Tong Chan, Chaiwan (HK)

(73) Assignee: Conair Corporation, Stamford, CT (US)

( * ) Notice: Subject to any disclaimer, the term of this patent is extended or adjusted under 35 U.S.C. 154(b) by 0 days.

(21) Appl. No.: 12/884,420

(22) Filed: Sep. 17, 2010

(65) Prior Publication Data

US 2011/0180645 A1  Jul. 28, 2011

Related U.S. Application Data

(60) Provisional application No. 61/244,300, filed on Sep. 21, 2009.

(51) Int. Cl.
*B02C 18/18* (2006.01)

(52) U.S. Cl. .................. 241/282.2; 241/292.1

(58) Field of Classification Search ............... 241/282.1, 241/282.2, 292.1; 366/205, 314
See application file for complete search history.

(56) References Cited

U.S. PATENT DOCUMENTS

| | | | | |
|---|---|---|---|---|
| 2,335,002 | A * | 11/1943 | Eppenbach et al. | 241/152.2 |
| 4,817,878 | A * | 4/1989 | Shibata | 241/282.2 |
| 6,027,242 | A * | 2/2000 | Thuma | 366/205 |
| 7,338,001 | B2 * | 3/2008 | Galban et al. | 241/282.1 |
| 2007/0215735 | A1 * | 9/2007 | Mulle | 241/282.1 |

* cited by examiner

*Primary Examiner* — Mark Rosenbaum
(74) *Attorney, Agent, or Firm* — McCormick, Paulding & Huber LLP

(57) ABSTRACT

A blade assembly 1 has a body 2 having a top, closed end 3, a bottom end 4 formed with an opening 5 at its end, and an interior chamber 6. A blade 7 having two cutting edges 8, 9 is fixed to the body 2, and it may be insert molded. A motor shaft engagement sleeve 10 has an opening 11 adapted to engage a driven shaft (not shown) of a conventional food processor motor (not shown) in order to transmit torque therefrom in order to rotationally drive the blade 7.

3 Claims, 2 Drawing Sheets

BLADE ASSEMBLY FOR FOOD PROCESSOR

CROSS-REFERENCE TO RELATED APPLICATIONS

This application relates to and claims priority from U.S. Provisional Application 61/244,300.

BACKGROUND OF THE INVENTION

The present invention relates to food preparation appliances and, more particularly, to countertop food processor appliances.

DESCRIPTION OF RELATED ART

Countertop food processor appliances generally comprise a base, a motor housed in the base, a bowl mounted on the base for receiving food product to be mixed or chopped, a blade rotationally driven by the motor and positioned in the bowl for rotation therein, and a cover or lid for the bowl. The bowl has a central opening on its floor to permit a drive shaft to extend therethrough, the drive shaft being adapted to receive a blade assembly. An electrical cord extends from the base and is adapted to be plugged into an external electrical source such as a wall socket to deliver electrical energy to the motor.

Countertop food processors typically include a blade assembly that comprises a cutting blade and a hub to which the blade is mounted wherein the hub is adapted to engage a rotationally driven shaft. Typically, the hub is a simple hollowed-out shaft with one open end and one closed end, configured to rest on and thereby engage a drive shaft. Such blade assemblies do not firmly seal against the drive shaft and, therefore, are prone to permit leakage of liquids or food products between the hub and the space between the hub and the bowl near where the shaft protrudes from the bowl.

OBJECT OF THE PRESENT INVENTION

It is an object of the present invention to provide a food processor blade assembly that seals relative to the bowl and that is positively retained to the drive shaft during use.

SUMMARY OF THE INVENTION

According to the present invention, a food processor blade assembly has an outer housing having a closed top end, an opened bottom end, and an interior chamber.

DESCRIPTION OF THE PREFERRED EMBODIMENT OF THE PRESENT INVENTION

Figure 1:
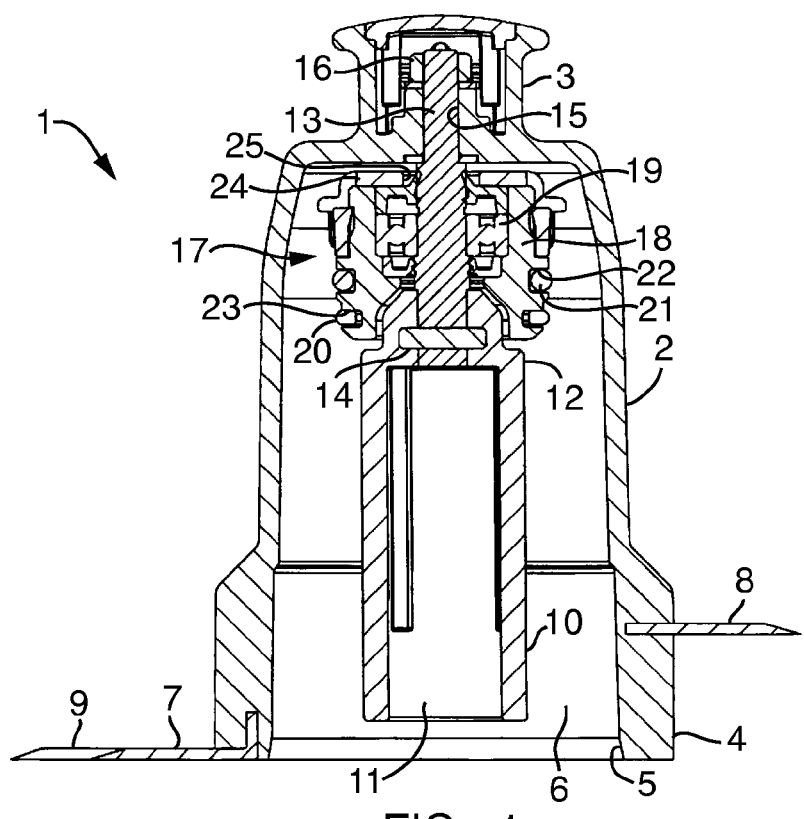
FIG. 1 is a side, cross-sectional view of a preferred embodiment of the present invention.
Figure 2:
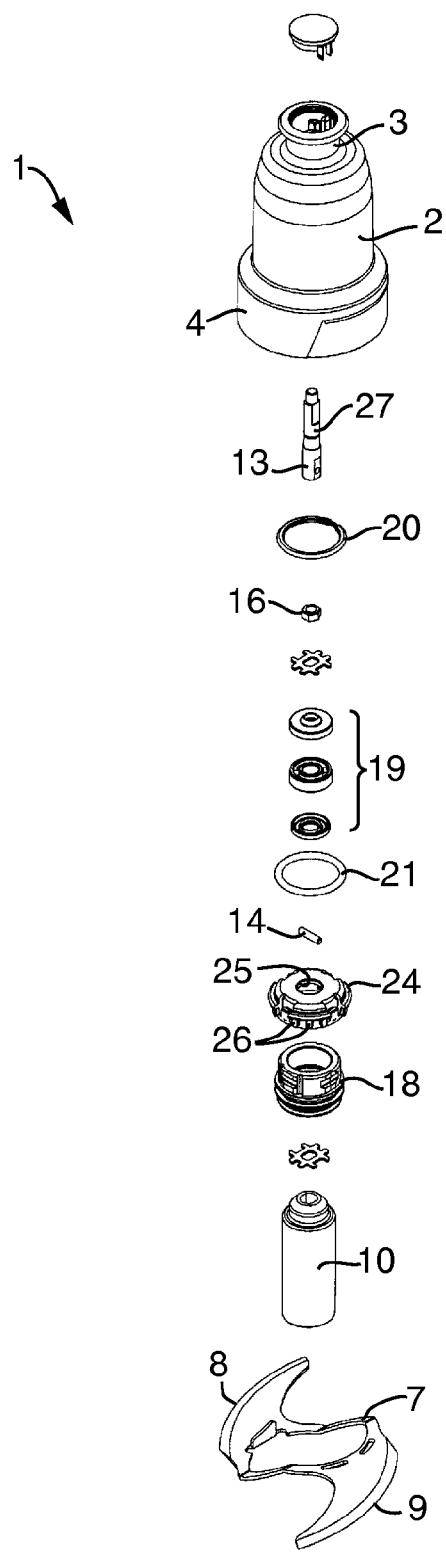
FIG. 2 is an exploded view of a preferred embodiment of the present invention.

Referring to FIGS. 1-2, a blade assembly 1 according to the present invention comprises a body 2 having a top, closed end 3, a bottom end 4 formed with an opening 5 at its end, and an interior chamber 6. A blade 7 having two cutting edges 8, 9 is fixed to the body 2, and it may be insert molded or otherwise attached. A motor shaft engagement sleeve 10 has an opening 11 adapted to engage a driven shaft (not shown) of a conventional food processor motor (not shown) in order to transmit torque therefrom in order to rotationally drive the blade 7. At its upper end 12, the sleeve 10 is attached by a pin connection 14 to metal shaft 13. The metal shaft 13 is attached to the body's upper end 3 by insertion through an opening 15 in the upper end 13 and fastening of a nut 16 or fastener to the shaft 13. A locking pin 27 with flat sections (not shown) of a type commonly known attach the shaft 13 to the housing 2 in order to prevent relative rotation between them. A bearing and sealing assembly 17 is positioned between the sleeve 11 and the upper end 3 of the body 2. Tightening of the nut 16 compresses the assembly 17 to the body 2 by drawing the sleeve 11 upwardly and stabilizes the sleeve 11 relative to the body 2.

The bearing and sealing assembly 17 comprises a generally cylindrical plastic body 18 through which the shaft 13 passes. A plurality of support bearings 19 maintain the connection between the shaft 13 and the body 2. A detent ring 20 is mounted in a groove 23 on the bearing and sealing assembly 17 and when the blade assembly 1 is mounted onto a bowl (not shown) which is mounted to a food processor drive base (not shown), the detent ring 20 engages the neck (not shown) of the bowl an is compressed during insertion until it passes beneath a shoulder in the neck. This provides a positive detent against lifting the blade assembly 1 off of the neck. A sealing ring 21 is retained in a groove 22 in the body 18. A bearing cap 24 is attached to the body 18. The cap 24 has a central opening 25 forming a bearing surface with the shaft 13.

During operation, the blade assembly 1 is positioned over the neck and onto a motor drive shaft (not shown) that protrudes through the neck. The detent ring 20 is slid into the neck and locks under the shoulder. A set of splines 26 on the cap 24 engage corresponding splines inside the neck to prevent relative movement between the bearing and sealing assembly 17 and the neck. Thus, when the output shaft (not shown) of the motor (not shown) rotates, it causes the sleeve 11, the metal shaft 13, and the body 2 and attached blade 7 to rotate together relative to the bowl neck. This is accomplished in a manner in which the bearing assembly 17 seals liquids or food product in the bowl to prevent leakage through the bowl neck.

While the preferred embodiment of the present invention has been disclosed herein, it is understood that various modification can be made without departing from the scope of the presently claimed invention.

What is claimed is:

1. A food processor blade assembly for mounting a rotating blade on a food processor, said assembly comprising:
   a generally cylindrically shaped body;
   a top, closed end of said body;
   a bottom end of said body;
   an opening at said bottom end;
   an interior chamber in communication with said opening;
   a blade having two cutting edges fixed to the body;
   a motor shaft engagement sleeve located in said interior chamber and attached to said body at said closed end of said body;
   a driven shaft engagement opening on one end of said sleeve; and
   a bearing and sealing assembly positioned between said sleeve and said body.

2. The food processor blade assembly of claim 1, wherein: said body and said blade are rotatable independently of said bearing and sealing assembly.

3. The food processor blade assembly of claim 1, wherein: said body, said blade and said engagement sleeve are rotatable relative to said bearing and sealing assembly.

* * * * *